INVENTOR.
JAMES K. LA FLEUR
BY
Paul Bliven
ATTORNEY

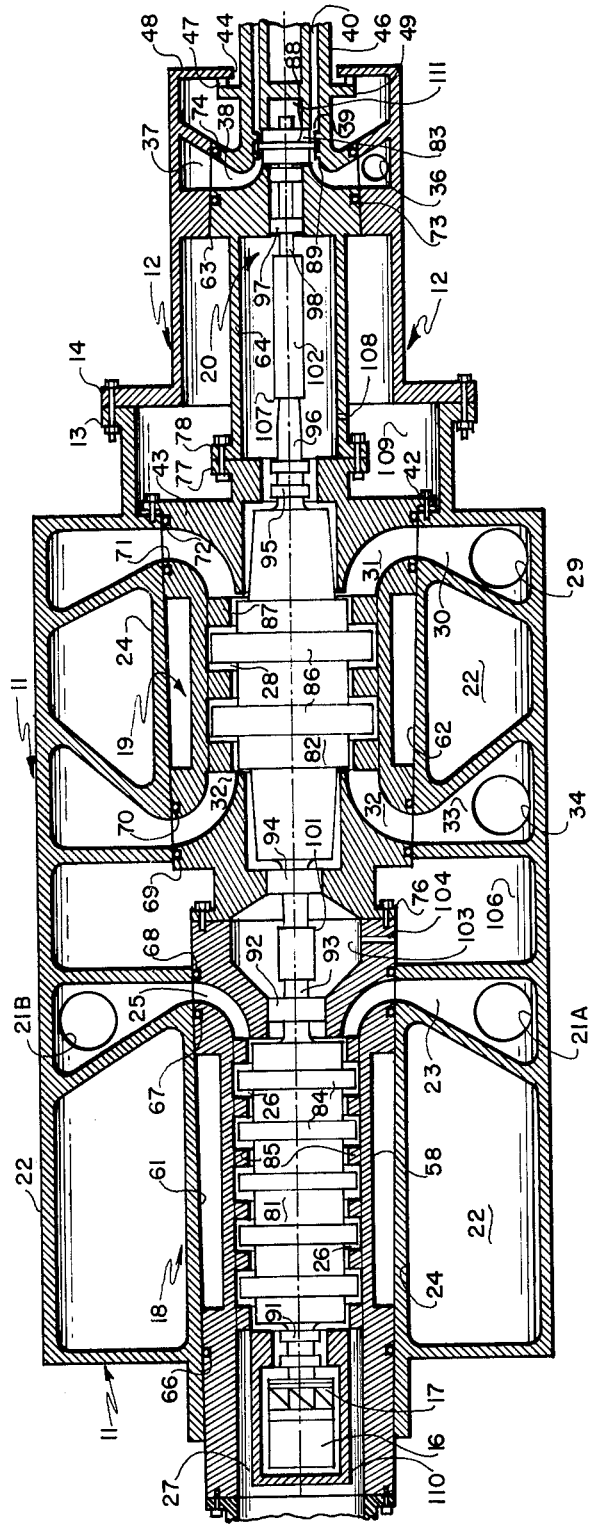

United States Patent Office 3,201,941
Patented Aug. 24, 1965

3,201,941
ASSEMBLY OF TURBOMACHINES
James K. La Fleur, Hermosa Beach, Calif., assignor to The La Fleur Corporation, Torrance, Calif., a corporation of California
Filed Apr. 18, 1963, Ser. No. 273,910
14 Claims. (Cl. 60—59)

The present invention relates to a construction assembly of a plurality of turbomachines in coaxial relationship so as to minimize the need for rotary seals between such machines, and to minimize the length and number of seals between the working medium and the atmosphere, and so as to provide for extensive subassemblies and ease of separation of such subassemblies. More particularly, the present invention applies when such assembly is one of turbines and compressors.

In the prior art of multiple stage turbines and multiple stage compressors, it has been the practice to split the casings thereof on an axial plane. This has resulted in the use of a large number of bolts to secure the casing halves together, and in many leaks and sealing difficulties. Further, such construction requires much time when it is necessary to open and close the casings. Further, such prior construction, as a practical matter, requires all of the conduit and instrumentation connections to be made to the bottom half of the casing, and where inlet and outlet passageways must be provided which surround the rotors of the machines, such must be provided in the top half of the casing. Such requirements increase the complexity of construction and the difficulty of sealing the casing. This sealing problem is greatly increased when the working medium becomes a gas such as hydrogen or helium. These gases are much more costly than water, carbon dioxide, or combustion products, and hydrogen is very explosive. Helium will leak in large quantities thru a structure where most fluids would not leak at all or in very small amounts.

Further, this leakage becomes a substantial loss when it is to the atmosphere as is the situation when each of the axially coupled turbomachines has a casing separate from the others, and that has to be provided with a rotary seal wherever a shaft extends thru such a casing. Such rotary seals are a constant source of maintenance and leakage on turbines. This is not to say that the present machines are not supplied with rotary seals on their shafts, however, small leakages thru such seals are not of importance as the gas from such leakage is not lost to the atmosphere. Also, in many instances, the machines may be so arranged that their adjacent ends carry the same or closely the same pressures so that if the space between such ends is kept at such pressure, there will be little if any leakage from such ends by way of the shaft seals.

The defects of the prior art and the achievement of the present invention may be summarized by stating that the length of the outside seals and gaskets of the present invention are short as compared with those of the prior art. This shortening of the outside seals, the seals between the working medium and the atmosphere, of turbomachinery is an object of the present invention.

A further object of the present invention is the elimination of working medium gas loss thru rotary seals.

Another object of the invention is construction of turbomachinery so that the parts thereof may be easily separated for inspection and repair. A part of this object is the construction of such machinery so that it comes apart on the basis of large subassemblies.

Specifically, it is an object of the present invention to couple a plurality of turbomachines together in end-to-end coaxial arrangement of stators and rotors to provide a subassembly, and to provide a housing for such subassembly which is designed to receive such subassembly by axial movement thereof into such housing, such housing to carry all the supply and instrumentation connections for such machines.

The above mentioned and other defects of the prior art are remedied and these objects, and others that will be apparent, achieved by constructing a housing that has a more or less conical bore from one end to the other. This bore may be considered to be formed by a series of cylindrical surfaces or surfaces of revolution that are reduced in diameter progressively from one end to the other of the bore. The rotors and stators of the machines are combined into one unit and inserted into the housing as a subassembly. Annular seals such as O-rings or rectangular piston rings provide the sealing means between the subassembly and the housing at various stations along their length. One or more removable caps may close the end openings of the housing or the subassembly may be capped and reliance for sealing placed on the annular seals between housing and subassembly.

A turbomachines assembly as described briefly above is illustrated in the accompanying drawings, in which:

FIGURE 1 is a longitudinal axial sectional view of a turbomachines assembly illustrating the present invention.

FIGURES 2 and 3 are enlarged views of portions of FIGURE 1 showing details of the sealing means thereof, with parts adjacent such seals broken away.

Figure 4:
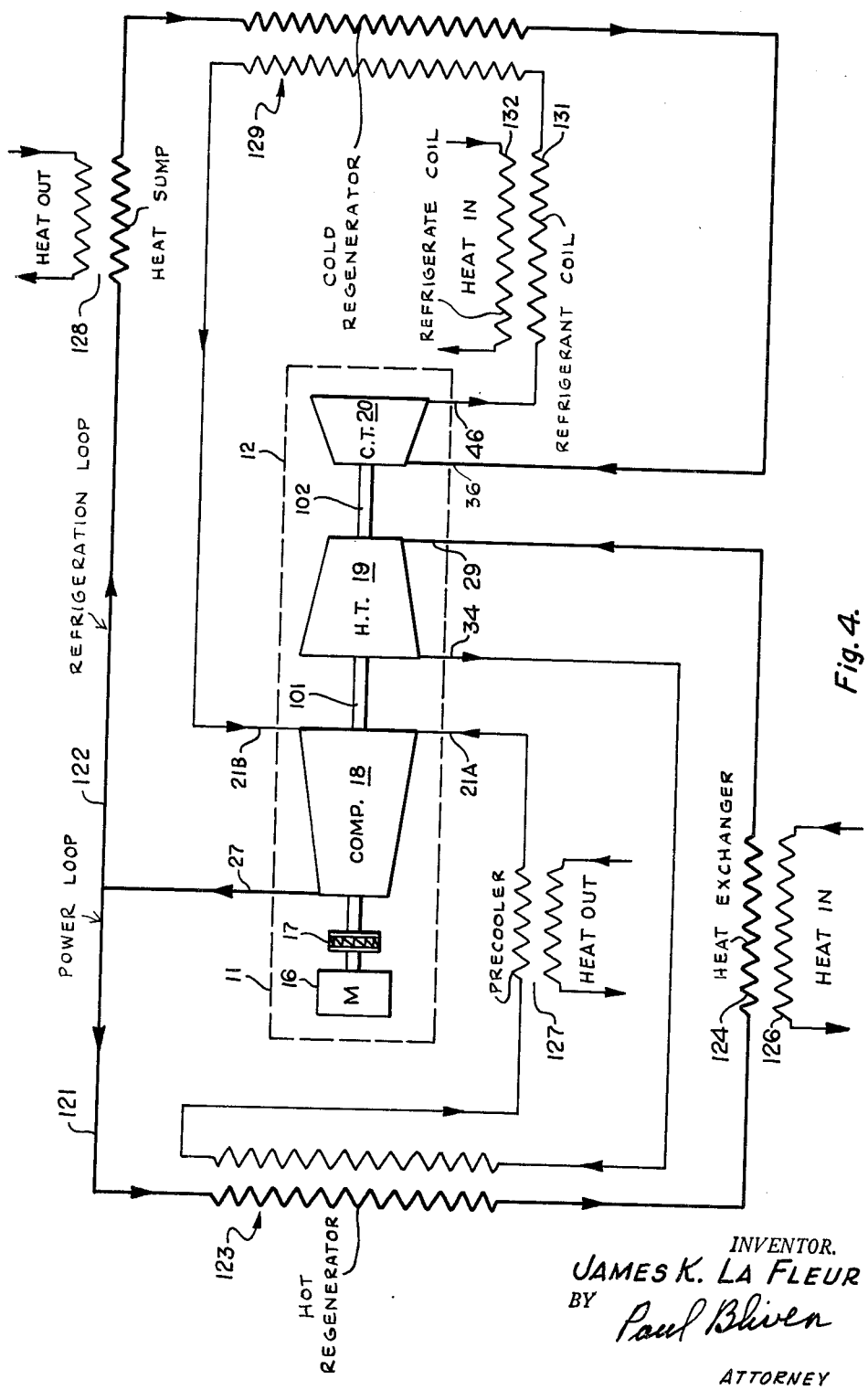
FIGURE 4 is a diagram illustrating the functioning of the turbomachines depicted in FIGURE 1, in a power-refrigeration system in which there are closed power and refrigeration cycles of operation.

The drawing of FIGURE 1 illustrates the present invention by a showing of a longitudinal sectional view thru an assembly of housing, stators, and rotors of a turbomachine comprising two multistage turbines, a multistage compressor, and a starting motor, all in coaxial end-to-end arrangement. In the detailed description hereinafter, the turbomachinery will be exemplified as a gas turbine and compressor using helium as a working medium and a refrigeration expansion turbine bleeding gas from such compressor.

In the illustration of FIGURE 1, the housing has been divided into two parts, a stationary part 11 and a movable part 12 which functions as a cap for the larger of the two open ends of the fixed part of the housing. The stationary and the movable cap parts of the housing are joined together at transaxial openings by flanged rings 13, 14, and these rings may be used to designate the respective adjacent openings of fixed and movable casing parts. Both casing parts are formed with annular chambers acting as transit conduits between the turbomachines' blade passages and the piping, or conduits, external to the machines which have not been shown. The basic operating units of the assembly are: from left to right of the drawing, a starting hydraulic motor 16 having therewith a one-way clutch 17, both shown schematically, the fluid lines from an external pump to the motor have not been shown; and next in order is a compressor 18, then a hot turbine 19, both located in the fixed part 11 of the casing, and finally a cold turbine 20 located in the movable part 12 of the casing. The compressor and the turbines are each multistage machines in which stationary blades alternate with rotating ones.

The functioning of the compressor and turbines may be outlined by orientating the gas flow therethru. Gas for compression is supplied to the fixed housing thru inlet openings 21A, 21B in the outer cylindrical shell 22 of the housing 11. The axes of the gas openings in the housing should be tangential to the outer shell 22. The compressor inlet openings 21 communicate with an annular plenum 23 formed in the housing. This plenum tapers radially inward of the housing to where it passes thru the inner shell 24 of the housing through a curved annular slot 25 that delivers the gas to the compressor's blade passage 26. From the blade passage, the gas passes out of the assembly to the left thru an annular, cylindrical sleeve-like outlet passage 27 that is a continuation of the blade passage. The hot turbine's blade passage 28 receives high pressure hot gas thru an inlet opening 29 in the outer shell 22, a plenum 30, and a curved annular slot 31, all similar to those of the compressor. From the blade passage 28 the gas leaves thru a curved annular slot 32, outlet plenum 33, and outer shell opening 34, all mirror images of the inlet, except for the design requirements resulting from pressure and temperature changes in the gas, but not shown in the present drawings. The movable part 12 housing the cold turbine 20 has an inlet opening 36 which communicates with an annular plenum 37 that is of much the configuration of the others. This plenum is connected by a curved annular slot 38 to the cold turbine blade passage 39. From the annular blade passage, the gas leaves the housing to the right thru an annular discharge passage 40 that is a continuation of the blade passage.

The stators and rotors of the compressor and each turbine each form a separate subassembly, and these subassemblies are joined together in end-to-end axial alignment into a larger subassembly that can be moved into and out of the fixed and movable housing parts 11 and 12 by relative axial movement therebetween when the housing flanges 13, 14 are unbolted so that the movable cap 12 can be axially moved from the fixed housing 11. The compressor and turbine stators and rotors are held to and in the stationary casing 11 by a ring of bolts in a locating flange 42 on and near the right hand end of the stator 43 of the hot turbine 19, just inside of and adjacent the fixed housing flange 13. The movable cap 12, or housing, may be removed from the cold turbine because the inside thereof tapers from the flange 14 either continuously or in steps to its right hand end where there is an opening 44 thru which projects a conduit 46 having formed therein the annular discharge passage 40 for the cold turbine 20. Adjacent this right hand opening of the cap is a compression seal 47, or gasket, that is clamped against the inside of the end flange 48 of the cap by a flange 49 carried by and externally of the discharge conduit 46. This compression seal 47 seals the right hand end opening of the combined housing 11, 12 and allows for some relative endways movement of the stators and rotors relative to the housings.

The seals preventing or minimizing longitudinal leakage of gas, that is leakage in a direction axially of the turbines, along the meeting surfaces between the casings and the stators of the machines, are ring type seals that rest in annular grooves in the circumferential portions of the stators. Enlarged from FIGURE 1 to substantially full scale, two types of such sealing rings are illustrated in FIGURES 2 and 3 by sectional views made by a plane containing the axis of the machines, as in FIGURE 1, and with parts adjacent the seals broken away. FIGURE 2 illustrates the use of a compound metallic ring which is of much the form used for sealing internal combustion engine pistons, a piston ring assembly. In the illustration, the ring is in an annular ring groove 51 cut in a cylindrical surface of the stator 43 of the hot turbine. This annular groove is closed on its open face by a closely fitting portion of the fixed housing inner shell 24. The surfaces of the stator and the housing contiguous the groove may be cylindrical as illustrated in FIGURES 2 and 3 or they may be slightly conical as it would appear from FIGURE 1. This ring is a split ring comprised of three parts, a ring 53 which is square in cross section with one face bearing against the housing, another ring 54 which is a right angle in cross section with the square ring resting in the angle and with the edge of one leg of the angle bearing on the housing surface, and a spring ring 55 which is placed in the bottom of the groove 51 to exert pressure against a leg of the angle ring 54 to push it and the square ring 53 outward against the adjacent housing surface. This spring ring has a wavey form peripherally thereof, and is usually made from a thin strip of resilient material. All of these ring parts are discontinuous peripherally for placement in a groove and so that they may expand and contract under the influence of the spring ring and of temperature changes in the machine parts, and to accommodate for changes in the internal diameter of the housing as the stator in which they are placed, moves radial or axially with respect to the housing, whatever the reason for such movement.

The seal illustrated in FIGURE 3 is of the O-ring type. These rings are made of rubber like compositions, are round and solid in cross section when not stressed, and usually continuous circumferentially. This form of seal is used with the compressor 18 and the cold turbine 20 while the form of FIGURE 2 is used with the hot turbine as the metallic seal withstands the high temperatures of the hot turbine, and the O-rings are better adapted for the compressor and cold turbine. In FIGURE 3, there is shown in cross section a ring groove 57 formed in the circumferential face of the stator, be it compressor or cold turbine, but for illustration the stator 58 of the compressor. The open face of this groove is closed by adjacent portions of the inner shell 24 of the housing 11. The O-ring 59 lies in the groove 57. The depth and width of the groove are proportioned to the thickness of the ring so that the ring firmly contacts the housing when stator and housing are assembled together. The groove is wide enough to allow for compression of the ring when the parts are assembled. As with the metallic seal ring, the opposed surfaces of the stator and housing may be cylindrical, as shown, adjacent the ring groove in FIGURES 2 and 3 or they may be conical as they appear to be in FIGURE 1. In either case, the assembly must be such that there is clearance for relative expansion between the parts, whether such expansion is radial or axial.

Seals of the types shown in FIGURES 2 and 3 allow the machine to be constructed with such clearances and, yet, to seal clearance spaces against the travel therethru of gas or lubricating oil. Such spaces are composed of the outer surfaces of the stators of the turbomachines in opposition to the inner surfaces of the housings of the present invention. Such surfaces have been generally indicated in the drawing of FIGURE 1 by a reference numeral applied to the axially counterposed intercept lines of such surfaces with the sectional plane. The meeting surface of stator and housing in the compressor may be designated as the intercept line 61 of the internal surface of the inner shell 24 of the housing 11. In the hot turbine, the intercept line 62 is, also, the internal surface of the adjacent portion 24 of the housing 11. In the cold turbine, the intercept line 63 is short with respect to the total axial length of the housing, and is only formed by a portion of the internal surface of the housing 12 where it is adjacent the outside of the cold turbine stator 64. As is apparent from FIGURES 1, 2, and 3, these intercept lines may be formed by the intersection of continuous or discontinuous conical surfaces, by stepped, or discontinuous, cylindrical surfaces, or by combinations of conical and cylindrical surfaces. Generally, such surfaces will be surfaces of revolution, but may even include ellipsoidal surfaces. The criteria being that the diameter of the meeting surfaces is reduced in the direction of insertion of the stators into the housings.

In FIGURE 1, an annular seal 66, such as the O-ring 59 of FIGURE 3, has been located adjacent the left hand end, as shown, of the compressor 18 to seal it against the atmosphere. Also, in the compressor there is another such annular seal, 67, 68 at each side of the gas inlet annular slot 25 at the compressor intercept 61 as it passes from the housing to the stator and the blade passage 26. Similarly, in the hot turbine 19 there is an annular seal, such as the ring assembly of FIGURE 2, at each side 69, 70 of the inlet and at each side 71, 72 of the outlet slots adjacent the hot turbine intercept 62.

Again, in the cold turbine 20, there is one of the O-ring annular seals 73, 74 at each side of the gas inlet slot 38 adjacent the intercept 63 of the turbine housing 12 with its stator 64. The right hand end of the cold turbine is sealed with the compression seal 47 around the turbine outlet conduit 46.

The three turbomachines are held together by rings of bolts so that once the ring of bolts 42 are removed from housing flanges 13, 14, and the movable housing cap 12 removed from the cold turbine 20, all the stators and their rotors may be moved as a single unit axially out of and back into the fixed housing 11. The tapered or stepped nature of the stators and the opposed interior surfaces of the housings makes this possible. Further, such stepping or tapering means that the various ring seals need slide but short distances on the housing interior before they reach their final position. The hot turbine stator 43 has at its left hand end a flange 76 that is bolted to the right hand end of the compressor stator 58; and the hot turbine and the cold turbine stators are bolted together at and by their contiguous flanges 77, 78.

The starting motor 16 and the clutch 17 have been illustrated by conventional symbols, and the illustration of details of the turbomachines, also, is by conventional symbols, or means. The compressor rotor 81, the hot turbine rotor 82, and the cold turbine rotor 83 are all shown in full view, not sectioned, and the rotor blading indicated by annular rings in all the machines. The fixed blading of the machines, the blades attached to the stators are between the rotor blade rings and have been cross hatched to indicate that they are part of the stators. There are shown five such rotor blade rings 84 and six such fixed blade rings 85 in the compressor, two rotor rings 86 and three fixed rings 87 in the hot turbine, and one rotor blade ring 88 and two fixed blade rings 89 in the cold turbine. The above numbers of blade rings is only illustrative. However, all of the machines are axial flow and multistaged. The compressor has a bearing assembly 91, 92 for the rotor adjacent each end of its shaft 93 thereof. Similarly, the hot turbine has a bearing assembly 94, 95 at each end of its rotor shaft 96. The cold turbine has a single bearing assembly 97 adjacent the left hand end of its shaft 98. Each of the machines has its own shaft and these shafts are joined together by means of splined sleeves for the transfer of power between the machines. The compressor shaft 93 is joined to the hot turbine shaft 96 by a splined sleeve 101, or coupling, and the cold turbine shaft 98 is joined to the hot turbine shaft by a long splined sleeve 102, or coupling. This latter sleeve is long and the two turbines spaced relatively far apart to reduce heat transfer from one to the other. With this arrangement, the three shafts of the machines are rotated as a single unit, but can be easily separated for servicing.

The various bearing units and splined sleeves are provided with oil supply means which have not been shown. However, the spaces between the turbomachines serve, as one of their purposes, to collect oil from the adjacent bearings. The space 103 inside of the compressor and hot turbine stators between their adjacent end bearings 92, 94 and surrounding the shafts; connecting splined sleeve 101 acts as one such oil collecting space. Oil from this space 103 may drain thru an opening 104 in the bottom of the space 103 to a sump 106 formed therebelow in the housing. Oil may be removed from this sump in any suitable manner. In a similar manner, oil from the adjacent hot and cold turbine bearings 95, 97 can collect in the space 107 surrounding the hot-cold turbine splined sleeve 102 and inside of the turbine stators. This latter space can drain thru an opening 108 into a sump 109 formed by the adjacent parts of the fixed and movable housing units, and the oil collecting in such sump may be removed therefrom in any suitable manner. The spaces between the ends of the rotors and the stators are made as small as possible, and various types of seals may be provided between the moving and fixed parts, as along the shafts, to reduce the leakage of gas from the various blade passages 26, 28, 39 to passage along the shaft ends. In the present disclosure, the outer shaft ends are in blind chambers such as the chamber 110 at the left hand end of the compressor shaft 93 which houses the starting motor 16 and the clutch 17. That is, this chamber is blind as far as the shaft is concerned as the end of the shaft does not extend outward thereof into the atmosphere. Similarly, the right hand end of the cold turbine shaft ends in a blind chamber 111. Leakage of gas from the housings is a serious problem when such gases as hydrogen or helium are being used as the working medium for the turbomachines. As to hydrogen, this is due to its combustibility with the oxygen in the air surrounding the housing, and as to helium this is due to its relatively high cost. With the closed construction of the housing, there are no rotary shaft seals thru the outer parts of the housing or the stators, and as the shaft ends between the turbomachines are enclosed in the stators and the housing, the only gas leakage that might be detrimental would be that which would occur from one machine to another in the housing. However, due to the present construction and use of the machines this problem is of a minor nature. The smallness of this inter machine gas leakage will be apparent from a consideration of the diagram of FIGURE 4.

The diagram of FIGURE 4 illustrates the functioning of the turbomachinery depicted in FIGURE 1 in a power-refrigeration system in which there are closed power and refrigeration cycles of operation. In FIGURE 4, the housing of FIGURE 1 is represented by the enclosure outlined by the dotted rectangle to which the same reference numerals 11, 12 have been applied. Similarly, in FIGURE 4 the compressor 18, the hot turbine 19, and the cold turbine 20 have received the reference numerals from FIGURE 1, as have the starting motor 16 and the clutch 17. Also, the conduits connecting the machines for the flow therethru of the working medium gas have been given the same reference numerals as the outlets and inlets of FIGURE 1. These are: the compressor lower inlet conduit 21A and upper inlet conduit 21B, the compressor outlet conduit 27, the hot turbine inlet 29 and outlet 34 conduits, and the cold turbine inlet 36 and outlet 46 conduits.

For the purpose of the following description and by way of example, the system will be described as using helium as the working gas medium for both the power and refrigeration cycles. The temperatures and pressures hereinafter given are by way of example, and are variable within limits not as part of the invention of the present disclosure. All pressures are pounds per square inch absolute (p.s.i.) and temperatures are degrees Rankine. Assuming the whole system of power and refrigeration has been in operation for a sufficient time to reach the intended operating conditions of temperature and pressure, helium enters the compressor 18 thru the inlet conduits 21A, 21B at a pressure of 181 p.s.i. and an ambient temperature of 530°. Helium is discharged from the high pressure side of the compressor at 268 p.s.i. and 618° thru the outlet conduit 27. The flow from the compressor outlet conduit 27 is divided into two high pressure side streams, namely, a power stream which flows thru one branch 121, or power loop, and a refrigeration stream which flows thru another branch 122, or refrigeration loop. The high pressure side of the power stream, or hot stream, first passes thru one side of a regenerator 123, the power or hot regenerator, where it is heated to 1493°. From the regenerator the high side power stream passes thru a combustion chamber heat exchanger coil 124 which serves to heat the gas to 1660°. Any suitable fuel or source of heat, as the coil 126, may be used. The power stream is led by the inlet 29 to and used to drive the hot turbine 19 which provides, thru the coupling 101 a large part of the power for the compressor 18. The gas expands and cools in the turbine, the gas pressure dropping therein from 258 p.s.i. to 190 p.s.i. and the gas temperature dropping therein to 1498° at the outlet 34, and then passes thru the other side, the low pressure side, of the hot regenerator 123 where it is cooled while heating the high side power stream in counter current flow thereto, to approximately the compressor discharge temperature. While, generically, this is called regeneration of the gas, or working medium, applicant uses the terms, "generation" and "degeneration" to indicate the gain or loss of heat, respectively, in a regenerator. Finally the gas passes thru a precooler 127 from which it is returned to the compressor 18 by way of the inlet 21A. The precooler may be water or air cooled, and serves as a heat sump for the power cycle to bring the working medium down to ambient temperature. The above described circuit constitutes the power cycle of the system. In the drawing, the high side conduit lines are heavier than the low side lines.

The cold, or refrigeration, stream which flows thru the refrigeration loop 122, passes first thru a heat sump 128, or aftercooler, where it is cooled to 530°, the ambient temperature, the pressure drop being slight, about 5 p.s.i. The stream then passes thru a regenerator 129, the cold regenerator, where it is cooled, or degenerated, to 141°. The gas emerging from the regenerator at 258 p.s.i. enters thru inlet 36 to drive the expansion turbine 20, wherein the gas expands to 190 p.s.i. with a drop in temperature to 128°. The cold turbine 20 serves to furnish, thru the coupling 102, a part of the power to drive the compressor 18. The cooled low pressure stream of helium then picks up heat while passing thru a heat exchanger coil 131 or other conduit means of high heat conductivity which acts as the refrigeration load for the system and the cycle. From the load coil 131, the low pressure helium returns to the cold regenerator 129 where it serves to cool the high pressure side helium. The helium then completes its refrigeration loop by returning to the compressor thru its inlets 21B at ambient temperature and compressor inlet pressure of 181 p.s.i. The material giving heat to the refrigeration load is passed thru a refrigerate coil 132 in heat exchange relationship with the refrigerant coil 131, the coils 131, 132 constituting a heat exchanger.

The system is started in operation by first supplying cooling water or air to the power heat sump 127, and then by spinning the compressor 18 and turbines 19, 20 by means of the motor 16 to start the gas working medium circulating in the power loop 121 of the power cycle. Once the machines are up to speed, heat is supplied to the furnace, or heat input exchanger 126, 124, so that the hot turbine 19 will take on the compressor's work of circulating the working medium. Then power to the starting motor 16 may be discontinued and the motor disconnected from the turbomachines common shaft. Once the hot turbine has taken on the compressor load, gas may be allowed to circulate in the refrigeration loop 122 and thru the cold turbine 20. Cooling medium is then supplied to the sump 128 of the loop, and then refrigerate material to the refrigerate coil 132. Air is one of the refrigerate materials, and its oxygen and nitrogen components will liquefy at the above given temperature of 128° at atmospheric pressure.

The above described system illustrates the use of the disclosed turbomachinery construction whereby the need for critical sealing of the rotating shafts of such machinery is eliminated. This is exemplified by the fact that the adjacent inlet openings of the hot and cold turbines are at the same pressure of 258 p.s.i., and the compressor inlet at 181 p.s.i. is adjacent the hot turbine outlet at 190 p.s.i. The turbine inlets are at the same pressure because of design, but design made easy because they both receive gas from a common pressure source, and with respect to such source each loop has therein the same pressure drop. While this is a design feature, it exemplifies that the inter machine adjacent gas ports may be at or substantially at the same pressure so as to reduce or eliminate gas travel between machines regardless of the sealing means therebetween.

Also, it is to be noted that the outlets of both the hot and cold turbines are at 190 p.s.i. so that these could be placed in adjacency to eliminate gas travel between adjacent machines. Such repositioning would require that the hot turbine inlet be placed adjacent the compressor outlet with only a 10 p.s.i. differential. However, if this were done, there would be a greater temperature differential between adjacent turbine ends than for the arrangement shown in the drawing and described therefor. Further, as shown, it is to be noted that the pressure at the hot turbine outlet is 190 p.s.i. against the adjacent compressor inlet pressure of 181 p.s.i., substantially equal pressures as such a small differential as 9 p.s.i. or 10 p.s.i. requires but little in the way of sealing means to stop axial movement of gas between hot turbine and compressor. However, it is very important to prevent leakage from the cold turbine as it is the most costly machine leakage because for every ten heat units input to the heater 124 of the hot turbine 19 there is only one to the refrigeration coil 131, approximately.

Having thus described my invention as applied to a particular assembly of turbomachines and their use in a power-refrigeration circuit, I claim:

1. A housing, totally contained in said housing a plurality of bladed turbomachines in coaxially aligned and coupled relationship, said housing being divided for assembly and disassembly into parts by division thereof transversely of such axis, adjacent ends of said machines being provided with a space inside of said housing, each of said machines being provided with a blade passage and an inlet and an outlet opening for each of said passages, a system providing for the circulation of a common gas through all of said passages, means supplying and removing heat from said gas so as to cause said machines to operate so that there is a pressure differential between the inlet and the outlet of each passage, and said machines and system being so arranged that adjacent ones of said openings are at substantially the same pressure.

2. The combination of claim 1 in which adjacent ones of said openings are at the same pressure.

3. The combination as defined in claim 1, said turbomachines including a turbine and a compressor, a shaft for said turbine and a shaft for said compressor in coaxially aligned and coupled relation, and rotors carried on each of said shafts, said turbine and said compressor, including their respective shafts and the rotors carried thereon being axially movable into and out of said housing.

4. A housing, totally contained in said housing a plurality of bladed turbomachines in coaxially aligned and coupled relationship, said housing being divided for assembly and disassembly into parts by division thereof transversely of such axis, adjacent ends of said machines being provided with a space inside of said housing, each of said machines being provided with a blade passage and an inlet and an outlet opening for each of said passages, a system providing for the circulation of a common gas through all of said passages, and means supplying and removing heat from said gas so as to cause said machines to operate so that there is a pressure differential between the inlet and the outlet of each passage.

5. A turbomachine assembly comprising a housing, a plurality of turbomachines contained within said housing, said turbomachines being in coaxially aligned and coupled relationship and forming a unit, each of said machines being provided with a blade passage and an inlet and an outlet opening for each of said passages, said housing having a tapered bore therein, said turbomachines unit received in said bore and being axially movable into and out of said bore in said housing from one end thereof, said bore being tapered in the direction of insertion of said turbomachines unit in said housing, and means removably maintaining said turbomachines in operative position in said housing.

6. A turbomachine assembly as defined in claim 5, said turbomachines including a turbine and a compressor, a shaft for said turbine and a shaft for said compressor in coaxially aligned and coupled relation, and rotors carried on each of said shafts, said turbine and said compressor, including their respective shafts and the rotors carried thereon being axially movable into and out of said bore in said housing.

7. A turbomachine assembly as defined in claim 6, the ends of each of said shafts being disposed in an essentially confined space in said housing.

8. A turbomachine assembly as defined in claim 5, including sealing means between each of said turbomachines and said conical bore.

9. In a turbomachine assembly, a subassembly comprising a plurality of turbomachines coupled together in end-to-end coaxial relation, said turbomachines each comprising stator means and rotor means, a housing, a tapered bore in said housing, said subassembly being axially movable into and out of said tapered bore of said housing from one end thereof, and means removably maintaining said subassembly in operative position in said bore.

10. A turbomachine assembly comprising a housing, a plurality of turbomachines contained within said housing, said turbomachines being in coaxially aligned and coupled relationship, each of said machines being provided with a blade passage and an inlet and an outlet opening for each of said passages, said housing having an essentially conical bore therein, said bore being formed by a plurality of cylindrical surfaces of revolution which are reduced in diameter progressively, each of said surfaces forming separate bore portions, said turbomachines each being received within one of said bore portions and being axially movable as a unit into and out of said bore in said housing, sealing means between said bore and said turbomachines, said sealing means being disposed axially of said bore, and means removably maintaining said turbomachines in operative position in said housing.

11. In a turbomachine assembly as defined in claim 10, said turbomachines including a turbine and a compressor, a shaft for said turbine and a shaft for said compressor in coaxially aligned and coupled relation, and rotors carried on each of said shafts, said coupled turbine and compressor unit forming a subassembly, said subassembly removably received by axial movement in said bore, with said compressor and said turbine received in adjacent bore portions, the ends of each of said shafts being disposed in an essentially confined space in said housing, said sealing means comprising a plurality of annular seals between said subassembly and said bore, said seals being spaced along the length of said bore.

12. A turbomachine assembly comprising a housing, a plurality of turbomachines including a compressor, a first turbine, and a second turbine, said compressor and said turbines each including a system of rotors and stators, a shaft for said compressor and a shaft for each of said turbines, the rotors of said compressor and the rotors of said turbines being carried on their respective shafts, means coupling said shafts in end-to-end coaxial alignment and providing a subassembly, said housing having a bore formed of a plurality of essentially conical bore portions, said subassembly received by axial movement in said bore, with said compressor and said turbines received in said respective conical bore portions, said housing being divided for assembly and disassembly into parts by division thereof transversely of the axis of said housing, adjacent ends of said turbomachines being provided with a space inside of said housing, each of said turbomachines being provided with a blade passage and an inlet and an outlet opening for each of said passages, end caps closing the ends of the bore in said housing and receiving therein opposite shaft ends of said turbomachines, and a plurality of annular seals between said subassembly and said bore, said seals being disposed along the length of said bore.

13. In combination, a gas turbine, a compressor, conduit means connecting said turbine and compressor in series to form a passageway through said conduit means and through said turbine and said compressor for a fluid working medium, and a common housing for said turbine, said compressor, and a portion of such passageway embodied in said turbine and compressor so that leakage from such portion of said passageway will be confined by said housing, and including a shaft which is the shaft for both said turbine and said compressor, and said turbine and compressor embodying rotors of which said shaft is a part, said rotors being axially movable in and out of said housing, and said conduit means being directly connected to said housing.

14. A turbomachine assembly as defined in claim 5, said tapered bore being a stepped taper.

References Cited by the Examiner
UNITED STATES PATENTS

| | | | |
|---|---|---|---|
| 667,744 | 2/01 | Stolze | 60—59 |
| 2,446,108 | 7/48 | Salzmann | 60—59 |
| 2,509,577 | 5/50 | Phillips | 60—52 X |
| 2,605,613 | 8/52 | Grebe | 60—52 |

JULIUS E. WEST, *Primary Examiner.*

EDGAR W. GEOGHEGAN, *Examiner.*